United States Patent
Tokuda et al.

(10) Patent No.: US 12,556,609 B2
(45) Date of Patent: Feb. 17, 2026

(54) COMMUNICATION METHOD, REFRIGERATION AND AIR CONDITIONING-RELATED SYSTEM, AND COMMUNICATION NODE

(71) Applicant: DAIKIN INDUSTRIES, LTD., Osaka (JP)

(72) Inventors: Mieharu Tokuda, Osaka (JP); Yuki Murakami, Osaka (JP); Wataru Aoto, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 19/105,830

(22) PCT Filed: Aug. 30, 2023

(86) PCT No.: PCT/JP2023/031588
§ 371 (c)(1),
(2) Date: Feb. 24, 2025

(87) PCT Pub. No.: WO2024/048666
PCT Pub. Date: Mar. 7, 2024

(65) Prior Publication Data
US 2026/0012508 A1    Jan. 8, 2026

(30) Foreign Application Priority Data

Aug. 30, 2022 (JP) ................................ 2022-136957

(51) Int. Cl.
*H04L 67/12* (2022.01)
*H04L 12/12* (2006.01)

(52) U.S. Cl.
CPC .............. *H04L 67/12* (2013.01); *H04L 12/12* (2013.01)

(58) Field of Classification Search
CPC .............................. H04L 67/12; H04L 12/12
See application file for complete search history.

(56) References Cited

U.S. PATENT DOCUMENTS

| | | | |
|---|---|---|---|
| 6,073,266 A | 6/2000 | Ahmed et al. | |
| 2009/0151382 A1* | 6/2009 | Okano | F24F 11/62 62/259.1 |

FOREIGN PATENT DOCUMENTS

| | | |
|---|---|---|
| JP | 2008-020092 A | 1/2008 |
| JP | 2018-146194 A | 9/2018 |
| JP | 2019-216537 A | 12/2019 |

OTHER PUBLICATIONS

International Search Report and Written Opinion mailed on Oct. 31, 2023, received for PCT Application PCT/JP2023/031588, filed on Aug. 30, 2023, 20 pages including English Translation.

(Continued)

*Primary Examiner* — Benjamin M Thieu
(74) *Attorney, Agent, or Firm* — XSENSUS LLP

(57) ABSTRACT

To provide a communication method, a refrigeration and air conditioning-related system, and a communication node.
A communication method for communicating information regarding a refrigeration and air conditioning-related unit between a plurality of communication nodes, wherein when transmitting information to a second communication node, a first communication node generates a message including a code indicating an attribute of the information or a type indicating a necessary or unnecessary of response to be designated according to the attribute, and transmits the message generated to the second communication node, and the second communication node determines the necessary or unnecessary of response, based on the code or the type included in the message received.

12 Claims, 16 Drawing Sheets

(56) References Cited

OTHER PUBLICATIONS

"ECHONET Lite Web API beginner's course", CEATEC 2021, Oct. 22, 2021, pp. 5-16.

Notice of Reasons for Refusal mailed on Oct. 24, 2023, received for JP Application 2023-139888, 12 pages including English Translation.

Decision to Grant a Patent mailed on Feb. 6, 2024, received for JP Application 2023-139888, 5 pages including English Translation.

Extended European search report issued on Dec. 18, 2025, in corresponding European patent Application No. 23860428.4, 8 pages.

J. Hofmann, "The Consumer Electronic Bus: an Integrated Multi-Media Lan for the Home", International Journal of Digital and Analog Communication Systems, vol. 4, No. 2, Apr. 1991, pp. 77-86, total 10 pages.

\* cited by examiner

COMMUNICATION METHOD, REFRIGERATION AND AIR CONDITIONING-RELATED SYSTEM, AND COMMUNICATION NODE

CROSS-REFERENCE TO RELATED APPLICATIONS

This application is the national under 35 U.S.C. § 371 of PCT International Application No. PCT/JP2023/031588 which has an International filing date of Aug. 30, 2023 and designated the United States of America, which claims priority to Japanese Patent Application No. 2022-136957 which has a filing date of Aug. 30, 2022, the entire contents of each are incorporated herein by reference.

TECHNICAL FIELD

The present disclosure relates to a communication method, a refrigeration and air conditioning-related system, and a communication node.

BACKGROUND ART

In a large-scale refrigeration and air conditioning-related system, for example, a network for communication is constructed in which a plurality of outdoor units are connected to one centralized control device and a plurality of indoor units are connected to each of the outdoor units (see, for example, Japanese Unexamined Patent Application Publication No. 2008-20092). Various types of data are transmitted and received between a plurality of devices including the centralized control device, the outdoor units, and the indoor units, and centralized control, cooperative operation, and the like of the devices are achieved.

SUMMARY

An aspect of the present disclosure provides a communication method for communicating information regarding a refrigeration and air conditioning-related unit between a plurality of communication nodes, wherein when transmitting information to a second communication node, a first communication node generates a message including a code indicating an attribute of the information or a type indicating a necessary or unnecessary of response to be designated according to the attribute, and transmits the message generated to the second communication node, and the second communication node determines the necessary or unnecessary of response, based on the code or the type included in the message received.

DESCRIPTION OF EMBODIMENTS

Hereinafter, a refrigeration and air conditioning-related system according to embodiments will be specifically described with reference to the drawings. It should be noted that the present technology is not limited to these examples, but is indicated by the scope of the claims, and is intended to include all modifications within the meaning and scope equivalent to the scope of the claims.

First Embodiment

Figure 1:
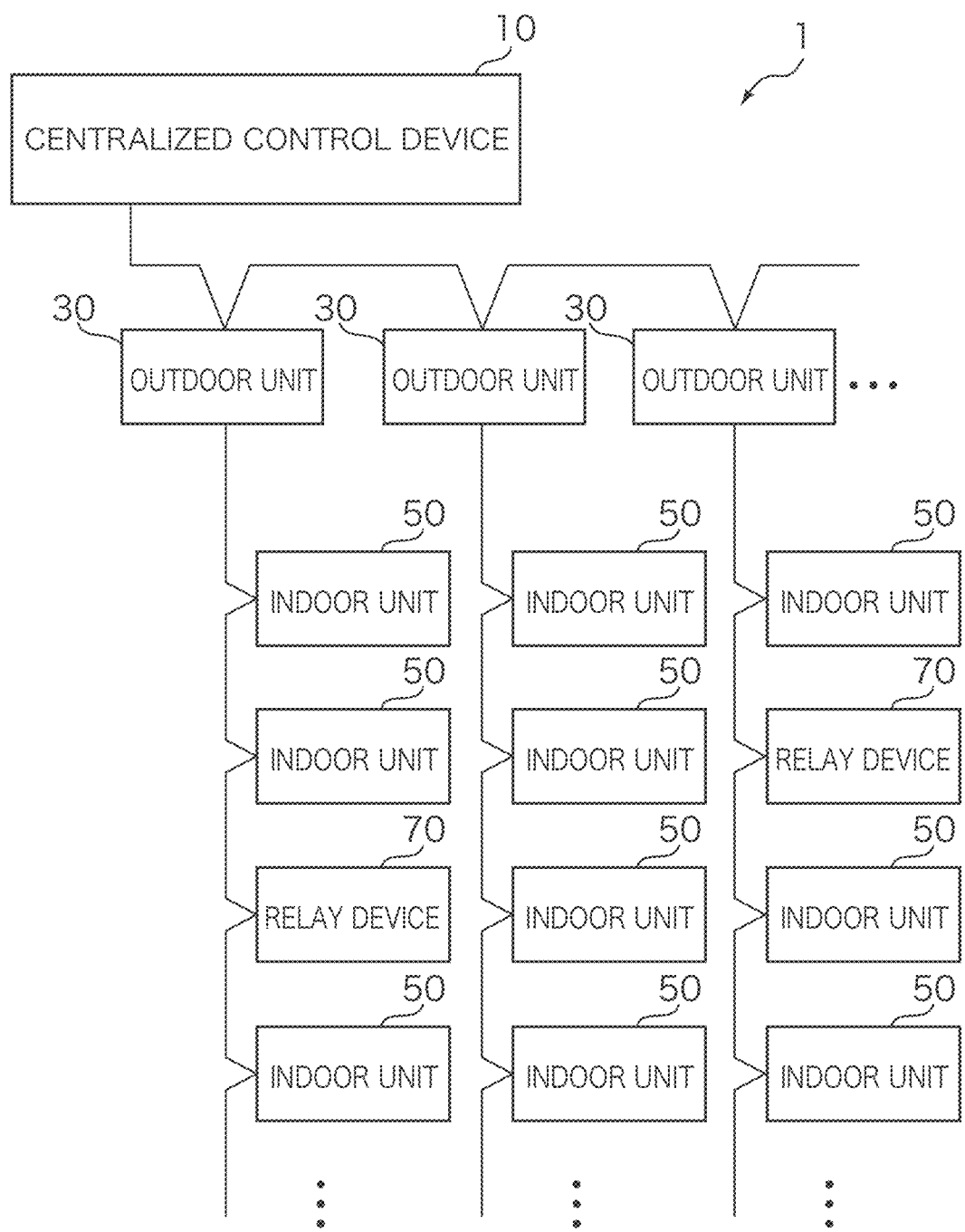
FIG. 1 is a schematic diagram showing a configuration example of a refrigeration and air conditioning-related system according to an embodiment.

FIG. 1 is a schematic diagram showing a configuration example of a refrigeration and air conditioning-related system according to an embodiment. A refrigeration and air conditioning-related system 1 according to the embodiment is a system for communicating information related to a refrigeration and air conditioning-related unit between a plurality of communication nodes. The communication nodes constituting the refrigeration and air conditioning-related system 1 include refrigeration and air conditioning-related devices, for example, a centralized control device 10, an outdoor unit 30, an indoor unit 50, and a relay device 70. The information transmitted and received between the communication nodes is information related to the refrigeration and air conditioning-related unit, and includes information related to refrigerant control, information related to a centralized monitoring operation, and the like. Here, the information related to the refrigeration and air conditioning-related unit may be information of the device itself, or may be information related to some of elements constituting the refrigeration and air conditioning-related device.

The communication node is not limited to those described above, and may include various refrigeration and air conditioning-related devices such as a service checker, a remote controller, a ventilator, a communication device, and a control device. In the following description, the refrigeration and air conditioning-related devices connected to the refrigeration and air conditioning-related system 1 as the communication nodes will also be simply referred to as devices.

In the refrigeration and air conditioning-related system 1 shown in FIG. 1, one centralized control device 10 and a plurality of outdoor units 30 are connected via a transmission line. In the present embodiment, a plurality of devices are connected in a daisy chain manner. That is, a first outdoor unit 30 is connected to the centralized control device 10 via a first transmission line, a second outdoor unit 30 is connected to the first outdoor unit 30 via a second transmission line, and a third outdoor unit 30 is connected to the second outdoor unit 30 via a third transmission line. Here, the plurality of transmission lines connecting the centralized control device 10 and the plurality of outdoor units 30 are electrically conducted. Therefore, for example, a signal transmitted by the centralized control device 10 can be received by all the outdoor units 30 connected in a daisy chain manner, and a signal transmitted by any one of the outdoor units 30 can be received by the centralized control device 10 and all the other outdoor units 30.

In the refrigeration and air conditioning-related system 1, a plurality of indoor units 50 are connected to each outdoor unit 30 via a transmission line in a daisy chain manner. That is, a first indoor unit 50 is connected to one outdoor unit 30 via a first transmission line, and a second indoor unit 50 is connected to the first indoor unit 50 via a second transmission line. The plurality of transmission lines connecting the outdoor unit 30 and the plurality of indoor units 50 are electrically conducted, and a signal transmitted by any of the devices can be received by all the devices connected in a daisy chain manner.

Each of the outdoor units 30 is connected to a transmission line for communicating with the centralized control device 10 and the other outdoor units 30, and a transmission line for communicating with the indoor unit 50. In the present embodiment, the two transmission lines are electrically conducted inside the outdoor unit 30. Therefore, for example, the centralized control device 10 can communicate with the indoor unit 50 via the outdoor unit 30. In addition, the indoor unit 50 connected to a first outdoor unit 30 can communicate with another indoor unit 50 connected to a second outdoor unit 30 via the first outdoor unit 30 and the second outdoor unit 30. The transmission line for communicating with the centralized control device 10 and the other outdoor units 30 may be electrically isolated from the transmission line for communicating with the indoor unit 50 within the outdoor unit 30.

The refrigeration and air conditioning-related system 1 may also include the relay device 70. For example, when a distance between two devices to be directly connected via a transmission line is long and a length of the transmission line exceeds a predetermined length, the relay device 70 is provided between these devices. The refrigeration and air conditioning-related system 1 illustrated in FIG. 1 is provided with two relay devices 70 connected between two indoor units 50 and 50. That is, the relay device 70 is connected to a first indoor unit 50 via a first transmission line, and a second indoor unit 50 is connected to the relay device 70 via a second transmission line.

The relay device 70 may be provided at any position in the refrigeration and air conditioning-related system 1. For example, the relay device 70 may be provided between the centralized control device 10 and the outdoor unit 30, between the two outdoor units 30 and 30, and between the outdoor unit 30 and the indoor unit 50. In addition, the relay device 70 may be provided between various devices other than the centralized control device 10, the outdoor unit 30, and the indoor unit 50. The relay device 70 is not essential, and the refrigeration and air conditioning-related system 1 may be constructed without including the relay device 70.

Figure 2:
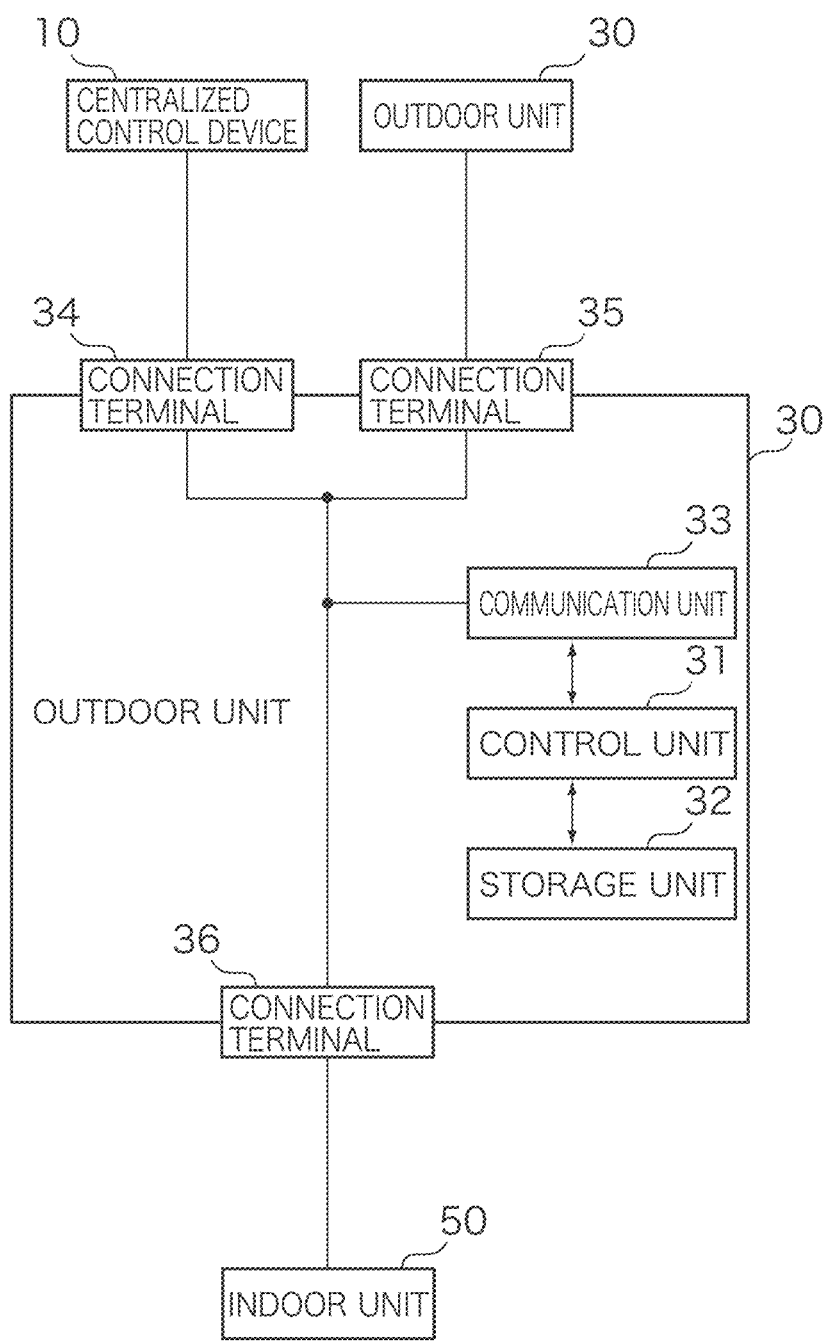
FIG. 2 is a block diagram illustrating a configuration example of an outdoor unit.

FIG. 2 is a block diagram illustrating a configuration example of the outdoor unit 30. The outdoor unit 30 includes, for example, a control unit 31, a storage unit 32, a communication unit 33, and connection terminals 34 to 36. The control unit 31 is configured with, for example, an arithmetic processing device such as a microcomputer or a central processing unit (CPU). The control unit 31 performs various types of processing by reading and executing programs stored in the storage unit 32. The control unit 31 performs various types of control processing, for example, control of the operation of each unit of the outdoor unit 30 and control of communication with the centralized control device 10, another outdoor unit 30, the indoor unit 50, and the like. The control unit 31 includes a built-in clock for outputting time information, a built-in timer for measuring elapsed time, and the like.

The storage unit 32 includes, for example, a nonvolatile memory such as a flash memory or an electrically erasable programmable read only memory (EEPROM), and a volatile memory such as a dynamic random access memory (DRAM) or a static random access memory (SRAM). The storage unit 32 stores various programs to be executed by the control unit 31 and various kinds of data necessary for control processing of the control unit 31. Various programs are stored in the nonvolatile memory. On the other hand, various kinds of data may be stored only in the volatile memory, or may be stored in the volatile memory and then copied and stored in the nonvolatile memory.

The communication unit 33 is configured with, for example, a transceiver integrated circuit (IC). The communication unit 33 communicates with the centralized control device 10, the other outdoor unit 30, and the indoor unit 50 via transmission lines connected to a plurality of connection terminals 34 to 36 provided in the outdoor unit 30. The communication unit 33 modulates data to be transmitted and received by, for example, orthogonal frequency division multiplexing (OFDM) scheme. Specifically, the communication unit 33 performs multi-carrier transmission using a frequency band of 2 to 28 MHz. The communication unit 33 transmits data by outputting a signal obtained by modulating transmission data supplied from the control unit 31 to the transmission line, and supplies data obtained by acquiring and demodulating a signal on the transmission line to the control unit 31 as reception data.

The communication unit 33 may have a multi-hop function. The multi-hop function is a function in which, when a second device receives a signal transmitted from a first device, the second device outputs the same signal as the received signal to a transmission line. Since each device outputs the same signal as the received signal, attenuation of the signal can be reduced, and the transmission distance of the signal can be extended.

Three connection terminals 34 to 36 are configured by using an electronic component such as a connector or a socket, and the transmission line for communication is detachably connected thereto. In the outdoor unit 30 according to the present embodiment, the three connection terminals 34 to 36 are electrically conducted via, for example, a wiring pattern on a circuit board, and are electrically connected to the communication unit 33. Therefore, a signal input from any one of the connection terminals 34 to 36 is output from the other connection terminals 34 to 36 and is input to the communication unit 33. The signal output by the communication unit 33 is output from the connection terminals 34 to 36. In the present embodiment, the three connection terminals 34 to 36 are directly conducted via the wiring pattern or the like, but, for example, a filter circuit or the like may be provided between the connection terminals 34 to 36. The number of connection terminals provided in the outdoor unit 30 may be two or less, or four or more.

Figure 3:
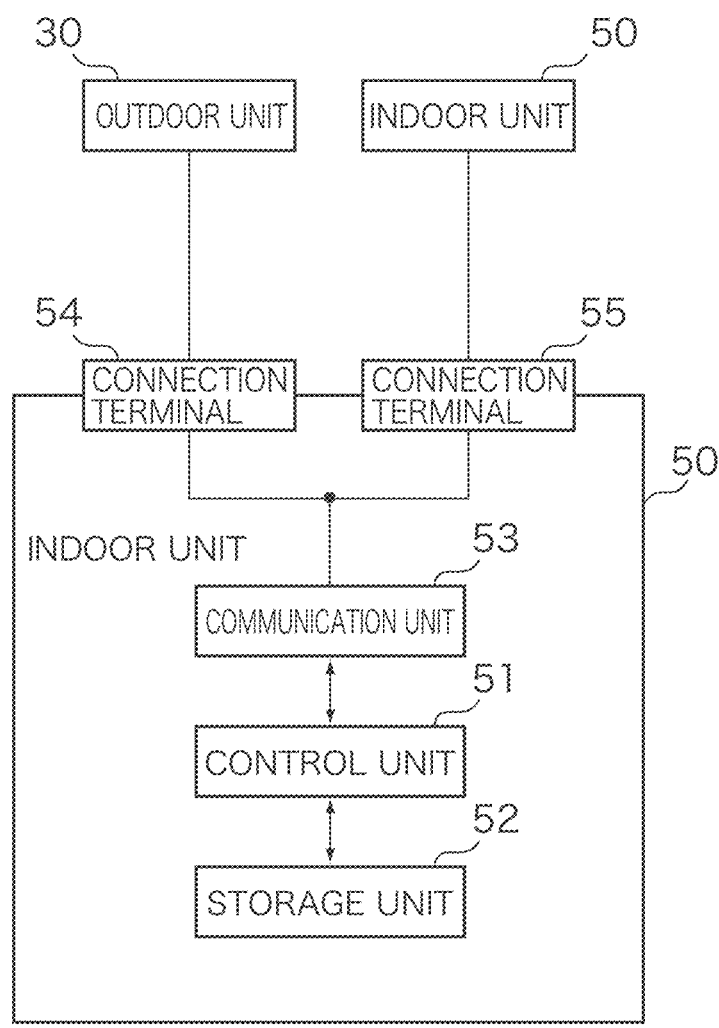
FIG. 3 is a block diagram illustrating a configuration example of an indoor unit.

FIG. 3 is a block diagram illustrating a configuration example of the indoor unit 50. The indoor unit 50 includes a control unit 51, a storage unit 52, a communication unit 53, and two connection terminals 54 and 55. The control unit 51 is configured with an arithmetic processing device such as a microcomputer or a CPU. The control unit 51 performs various types of control processing, for example, control of the operation of each unit of the indoor unit 50 and control of communication with the centralized control device 10, the outdoor unit 30, another indoor unit 50, and the like. The control unit 51 includes a built-in clock for outputting time information, a built-in timer for measuring elapsed time, and the like.

The storage unit 52 includes, for example, a nonvolatile memory such as a flash memory or an EEPROM, and a volatile memory such as a DRAM or an SRAM. The storage unit 52 stores various programs to be executed by the control unit 51 and various kinds of data necessary for control processing of the control unit 51. Various programs are stored in the nonvolatile memory. On the other hand, various kinds of data may be stored only in the volatile memory, or may be stored in the volatile memory and then copied and stored in the nonvolatile memory.

The communication unit 53 is configured with, for example, a transceiver IC. The communication unit 53 has the function similar to that of the communication unit 33 of the outdoor unit 30, and an IC can be used that is the same as or similar to the IC used in the communication unit 33 of the outdoor unit 30. The communication unit 53 has a modulation function using an OFDM scheme and a multi-hop function, and communicates with the centralized control device 10, the outdoor unit 30, the other indoor unit 50, and the like via the transmission lines connected to the connection terminals 54 and 55 provided in the indoor unit 50. The communication unit 53 transmits data by outputting a signal obtained by modulating transmission data supplied from the control unit 51 to the transmission line, and supplies data obtained by acquiring and demodulating a signal on the transmission line to the control unit 51 as reception data.

Two connection terminals 54 and 55 are configured by using an electronic component such as a connector or a socket, and the transmission line for communication is detachably connected thereto. The connection terminals 54 and 55 are electrically conducted via, for example, a wiring pattern on a circuit board, and are electrically connected to the communication unit 53. The number of connection terminals provided in the indoor unit 50 may be one or three or more.

Figure 4:
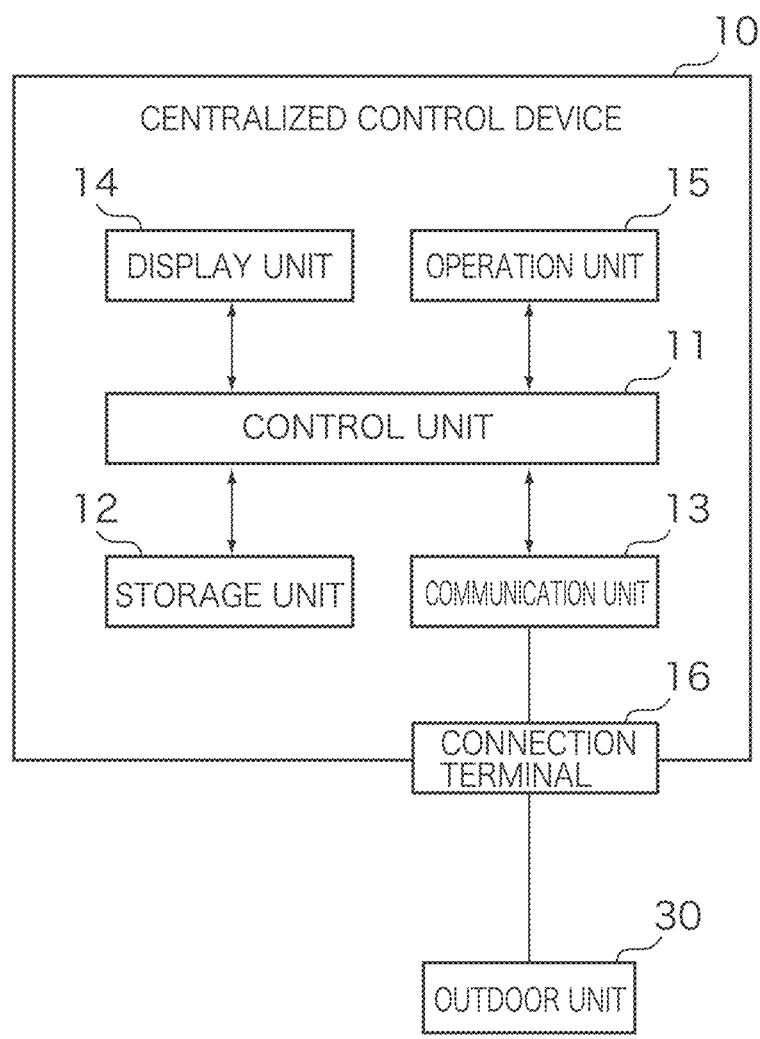
FIG. 4 is a block diagram illustrating a configuration example of a centralized control device.

FIG. 4 is a block diagram illustrating a configuration example of the centralized control device 10. The centralized control device 10 includes, for example, a control unit 11, a storage unit 12, a communication unit 13, a display unit 14, an operation unit 15, and a connection terminal 16. The control unit 11 is configured with an arithmetic processing device such as a CPU. The control unit 11 performs various types of control processing, for example, control of the operation of each unit of the centralized control device 10 and control of communication with the outdoor unit 30, the indoor unit 50, and the like. The control unit 11 includes a built-in clock for outputting time information, a built-in timer for measuring elapsed time, and the like.

The storage unit 12 includes a nonvolatile memory such as a flash memory or an EEPROM (or a magnetic storage device such as a hard disk) and a volatile memory such as a DRAM or an SRAM. The storage unit 12 stores various programs to be executed by the control unit 11 and various kinds of data necessary for control processing of the control unit 11. Various programs are stored in the nonvolatile memory. On the other hand, various kinds of data may be stored only in the volatile memory, or may be stored in the volatile memory and then copied and stored in the nonvolatile memory.

The communication unit 13 is configured with, for example, a transceiver IC. The communication unit 13 has the function similar to that of the communication unit 33 of the outdoor unit 30 and the communication unit 53 of the indoor unit 50, and an IC can be used that is the same as or similar to the IC used in the communication unit 33 of the outdoor unit 30 and the communication unit 53 of the indoor unit 50. The communication unit 13 has a modulation function using an OFDM scheme and a multi-hop function, and communicates with the outdoor unit 30, the indoor unit 50, and the like via a transmission line connected to the connection terminal 16 provided in the centralized control device 10. The communication unit 13 transmits data by outputting a signal obtained by modulating transmission data supplied from the control unit 11 to the transmission line, and supplies data obtained by acquiring and demodulating a signal on the transmission line to the control unit 11 as reception data.

The display unit 14 is configured with a liquid crystal display or the like, and displays various images, characters, and the like under the control of the control unit 11. The operation unit 15 accepts a user's operation and notifies the control unit 11 of the accepted operation. For example, the operation unit 15 accepts the user's operation through an input device such as a mechanical button or a touch panel provided on the surface of the display unit 14. Furthermore, for example, the operation unit 15 may be input devices such as a mouse and a keyboard, and these input devices may be configured to be detachable from the centralized control device 10. The connection terminal 16 is configured using, for example, an electronic component such as a connector or a socket, and a transmission line for communication is detachably connected thereto. The connection terminal 16 is electrically connected to the communication unit 13 via, for example, a wiring pattern on a circuit board. The number of connection terminals provided in the centralized control device 10 may be two or more.

Figure 5:
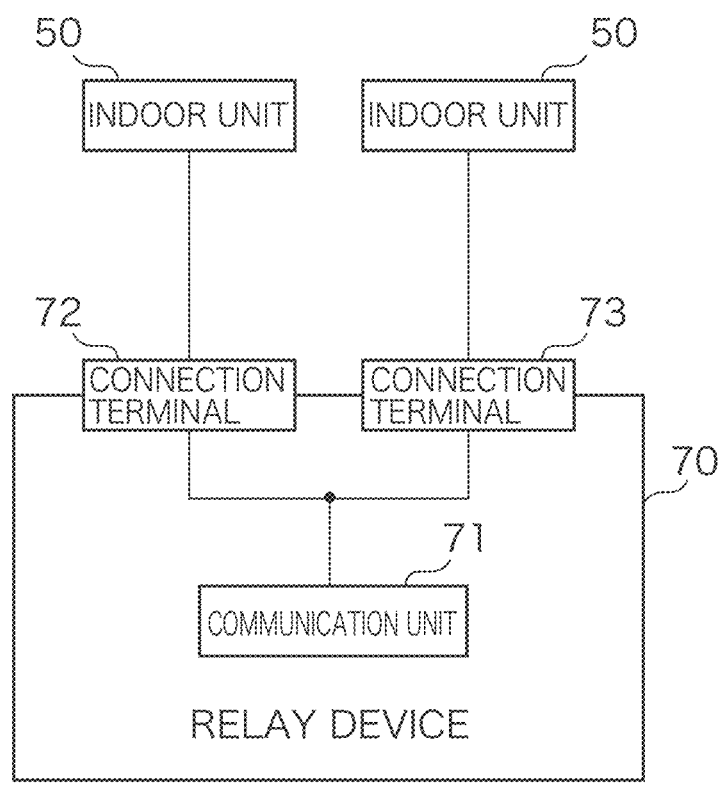
FIG. 5 is a block diagram showing a configuration example of a relay device.

FIG. 5 is a block diagram showing a configuration example of the relay device 70. The relay device 70 according to the present embodiment is configured to include, for example, a communication unit 71 and two connection terminals 72 and 73. The communication unit 71 is configured using, for example, a transceiver IC. The communication unit 71 has the function similar to that of the communication unit 33 of the outdoor unit 30, the communication unit 53 of the indoor unit 50, and the communication unit 13 of the centralized control device 10, and an IC can be used that is the same as or similar to the IC used in these units. The communication unit 71 has a modulation function using an OFDM scheme and a multi-hop function, and communicates with the centralized control device 10, the outdoor unit 30, the indoor unit 50, and the like via the transmission lines connected to the connection terminals 72 and 73 provided in the relay device 70. The communication unit 71 of the relay device 70 may have at least the multi-hop function, and does not necessarily have the modulation function using the OFDM scheme.

Two connection terminals 72 and 73 are configured using, for example, an electronic component such as a connector or a socket, and a transmission line for communication is detachably connected thereto. The connection terminals 72 and 73 are electrically conducted via, for example, a wiring pattern on a circuit board, and are electrically connected to the communication unit 71. The number of connection terminals provided in the relay device 70 may be one or three or more.

In the refrigeration and air conditioning-related system 1, the plurality of devices such as the centralized control device 10, the outdoor unit 30, the indoor unit 50, and the relay device 70 are connected in a daisy chain manner via the transmission lines, and perform multi-carrier communication by the OFDM modulation scheme. The plurality of transmission lines connecting the plurality of devices are electrically conducted, and a signal transmitted by one device can be received by all the other devices. When each of the devices has a multi-hop function of outputting the same signal as the received signal to the transmission line, it is possible to extend the transmission distance of the signal by increasing the intensity of the signal that attenuates according to the transmission distance from the transmission source.

An example of a communication scheme capable of using the OFDM modulation and the multi-hop function includes a communication scheme of high definition power line communication (HD-PLC). The communication unit of each of the devices may be configured with, for example, a transceiver IC that employs the communication scheme of HD-PLC. The communication scheme of HD-PLC performs communication via a power line, but each of the devices in the refrigeration and air conditioning-related system 1 according to the embodiment does not perform communication via a power line, but performs communication via a transmission line provided separately from the power line.

Figure 6:
FIG. 6 is a conceptual diagram showing a format of a message (telegram) transmitted and received between devices.

FIG. 6 is a conceptual diagram showing a format of a message (telegram) transmitted and received between the devices. A communication protocol used in the refrigeration and air conditioning-related system 1 according to the embodiment is as follows. HD-PLC and Ethernet (registered trademark) are used for a physical/data link layer. IPv6 is used for a network layer. User datagram protocol (UDP) and transmission control protocol (TCP) are used for a transport layer. REST API using hypertext transport protocol (HTTP) or the like is used for an application layer.

The IPv6 is suitable for the refrigeration and air conditioning-related system 1. Various devices connected so as to be mutually accessible are identified by IP addresses with a common specification, and can perform communication.

The UDP is suitable for the refrigeration and air conditioning-related system 1. Even when a large number of indoor units 50 are connected to the outdoor unit 30, since no connection is established as in the TCP, the memory of the outdoor unit 30 is not used up.

The REST API is suitable for the refrigeration and air conditioning-related system 1. A request and a response can correspond to each other, and data can be retransmitted when the request fails. In addition, when a method to be described below is designated, it is possible to acquire and update data related to control, operating status, and the like between the devices.

In the embodiment, when one device (first communication node) transmits information to another device (second communication node), the first communication node as a transmission source generates a message including a code indicating an attribute of the information and a type indicating a necessary or unnecessary of response to be designated according to the attribute, and transmits the generated message to the second communication node as a destination.

The code indicating the attribute of the information represents an operation on data and is also called a method. In the embodiment, "GET" representing an operation of acquiring data of a partner, "SET" representing an operation of updating data of the partner, "INF" representing an operation of notifying its own data, and the like can be used as methods. Since a response is necessary to acquire data, a necessary of response is designated as a type for the method "GET". On the other hand, since a response is unnecessary for an operation of updating a value or an operation of notifying information, an unnecessary of response is designated as a type for the methods "SET" and "INF". The method is not limited to the above, and may include "DELETE" or the like representing an operation of deleting data of the partner.

The above-described methods and the necessary or unnecessary of response can be described in an application layer header. As the methods "GET", "SET", and "INF", for example, "GET", "POST", and "PUT" defined in HTTP may be used, respectively, and can be designated in an HTTP header.

Further, an HTTP query can be used for whether a response is necessary. That is, "res=true" may be designated in the HTTP query when a response is necessary, and "res=false" may be designated in the HTTP query when a response is unnecessary.

Hereinafter, an application example in the refrigeration and air conditioning-related system 1 will be described.

The communication in the refrigeration and air conditioning-related system 1 broadly includes communication related to refrigerant control and communication related to centralized control. The communication related to the refrigerant control is mainly communication between the outdoor unit 30 and the indoor unit 50 connected by a refrigerant pipe, and is communication for performing air conditioning by appropriately controlling the devices. On the other hand, the communication related to the centralized control is communication for centrally monitoring and operating the outdoor unit 30 and the indoor unit 50 from the centralized control device 10.

Figure 7:
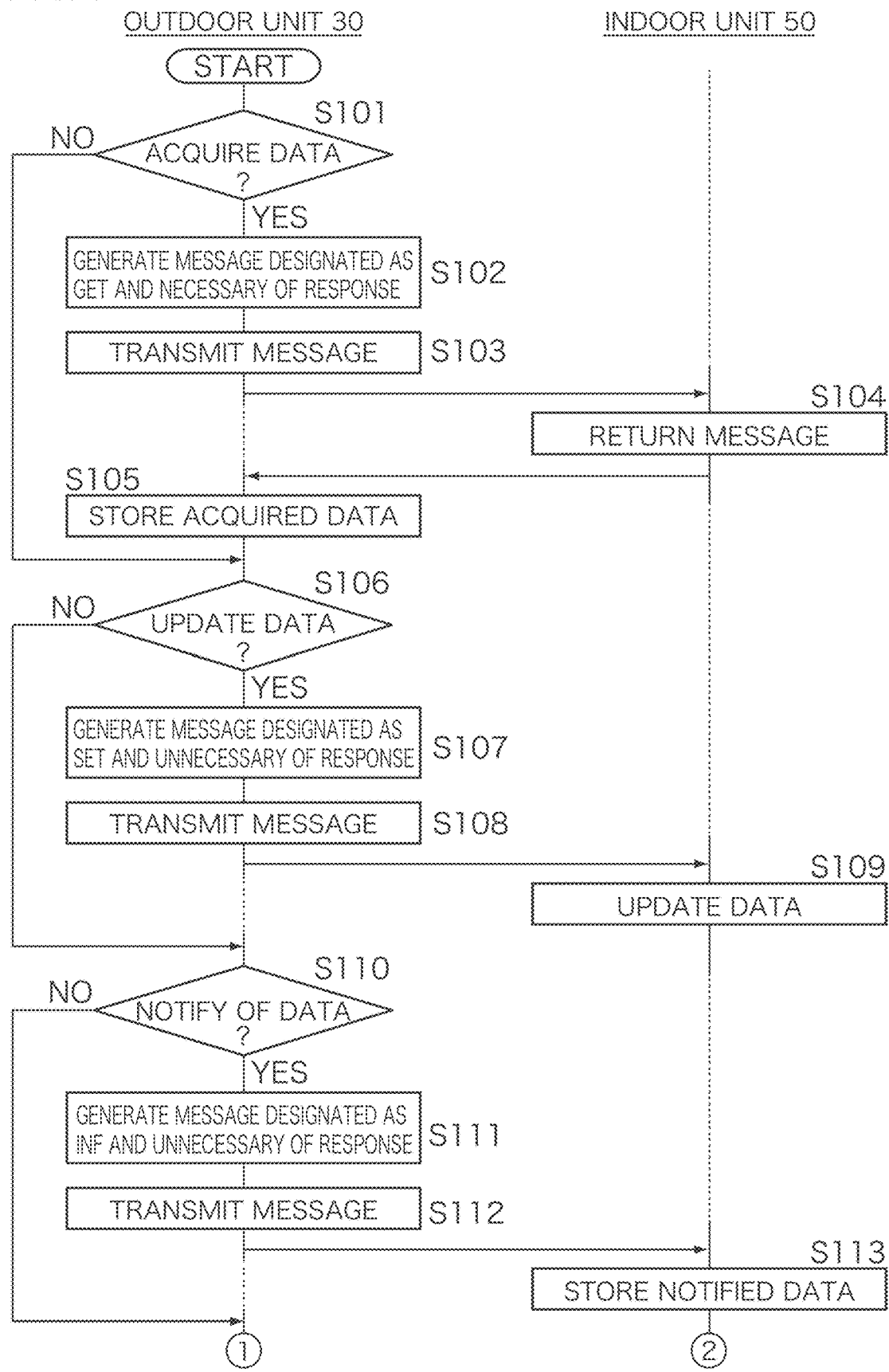
FIG. 7 is a flowchart illustrating a communication protocol in communication related to refrigerant control.
Figure 8:
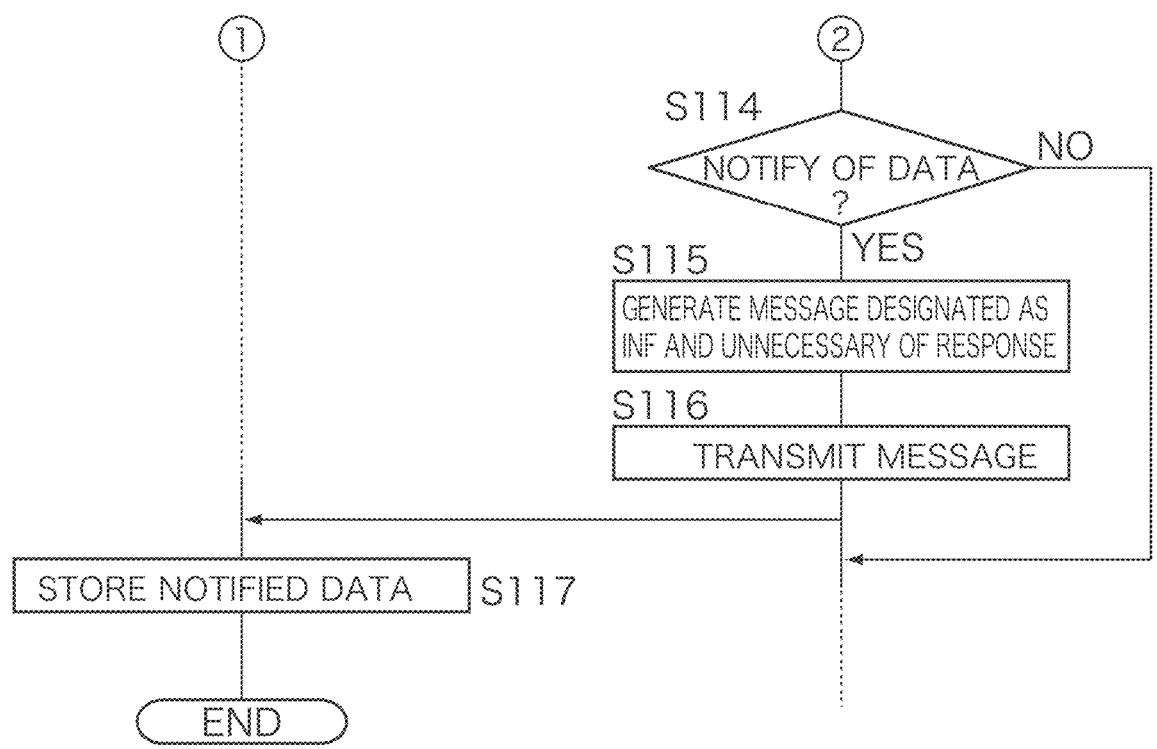
FIG. 8 is a flowchart illustrating the communication protocol in communication related to refrigerant control.

FIGS. 7 and 8 are flowcharts illustrating a communication protocol in the communication related to the refrigerant control. In the communication related to the refrigerant control, one outdoor unit 30 serves as a parent in a refrigerant system, and communicates with a plurality of indoor units 50 (children) and other outdoor units 30 (parents). In the flowchart of FIG. 7, for simplification, a communication protocol between one outdoor unit 30 serving as a parent and one indoor unit 50 serving as a child will be described. Each of the outdoor unit 30 and the indoor unit 50 internally stores data of a communication partner and updates the data by communication. The outdoor unit 30 and the indoor unit 50 determine their own operations with reference to the data stored therein.

The control unit 31 of the outdoor unit 30 determines whether to acquire data of the indoor unit 50 (step S101). The control unit 31 may refer to the output of the built-in clock or the built-in timer to determine whether the current time point corresponds to a timing set as an acquisition timing, and determine whether to acquire the data of the indoor unit 50. As the acquisition timing for data, for example, a periodic timing is designated.

When determining to acquire the data of the indoor unit 50 (S101: YES), the control unit 31 generates a message including an application layer header in which the method is designated as "GET" and the necessary or unnecessary of response is designated as "necessary" (step S102). The control unit 31 transmits the generated message from the communication unit 33 to the indoor unit 50 as a destination (step S103).

When receiving the message transmitted from the outdoor unit 30, the control unit 51 of the indoor unit 50 checks the application layer header of the received message. When the method is designated as "GET" in the application layer header, the necessary or unnecessary of response is "necessary", and thus the control unit 51 generates a message including the data requested by the outdoor unit 30 and returns the message to the outdoor unit 30 (step S104).

When receiving the reply message from the indoor unit 50, the control unit 31 of the outdoor unit 30 causes the storage unit 32 to store the data included in the received message (step S105). Here, the received message may be stored only in the volatile memory provided in the storage unit 32, or may be stored in the volatile memory and then copied and stored in the nonvolatile memory.

Next, the control unit 31 of the outdoor unit 30 determines whether to update the data of the indoor unit 50 (step S106). The control unit 31 may refer to the output of the built-in clock or the built-in timer to determine whether the current time point corresponds to a timing set as an update timing, and determine whether to update the data of the indoor unit 50. For example, a periodic timing is designated as the data update timing.

When determining to update the data of the indoor unit 50 (S106: YES), the control unit 31 generates a message including an application layer header in which the method is designated as "SET" and the necessary or unnecessary of response is designated as "unnecessary" (step S107). The control unit 31 transmits the generated message from the communication unit 33 to the indoor unit 50 as a destination (step S108).

When receiving the message transmitted from the outdoor unit 30, the control unit 51 of the indoor unit 50 checks the application layer header of the received message. When the method is designated as "SET" in the application layer header, the necessary or unnecessary of response is "unnecessary", and thus the control unit 51 does not reply to the received message and updates the data stored in the storage unit 52 (step S109). The data to be updated may be stored in the volatile memory provided in the storage unit 52 or the nonvolatile memory.

Next, the control unit 31 of the outdoor unit 30 determines whether to notify the indoor unit 50 of its own data (step S110). The control unit 31 may refer to the output of the built-in clock or the built-in timer to determine whether the current time point corresponds to a timing set as a notification timing, and determine whether to notify the indoor unit 50. As the timing of notification to the indoor unit 50, for example, a periodic timing is designated. Further, as the timing of notification to the indoor unit 50, a timing may be designated at which an internal state has changed. Here, the change in the internal state represents a change in the values of various sensors or actuators provided in the device or a change in the control state.

When determining to notify the indoor unit 50 of the data (S110: YES), the control unit 31 generates a message including an application layer header in which the method is designated as "INF" and the necessary or unnecessary of response is designated as "unnecessary" (step S111). The control unit 31 transmits the generated message from the communication unit 33 to the indoor unit 50 as a destination (step S112).

When receiving the message transmitted from the outdoor unit 30, the control unit 51 of the indoor unit 50 checks the application layer header of the received message. When the method is designated as "INF" in the application layer header, the necessary or unnecessary of response is "unnecessary", and thus the control unit 51 does not reply to the received message and causes the storage unit 52 to store the notified data (step S113). Here, the received message may be stored only in the volatile memory provided in the storage unit 52, or may be stored in the volatile memory and then copied and stored in the nonvolatile memory.

The indoor unit 50 basically only receives communication from the outdoor unit 30, but may notify the outdoor unit 30 of data when the internal state changes due to an operation of a remote controller, for example.

The control unit 51 of the indoor unit 50 determines whether to notify the outdoor unit 30 of its own data (step S114). When there is a change in the internal state of the own device and it is determined to notify the data (S114: YES), the control unit 51 generates a message including an application layer header in which the method is designated as "INF" and the necessary or unnecessary of response is designated as "unnecessary" (step S115). The control unit 51 transmits the generated message from the communication unit 53 to the outdoor unit 30 as a destination (step S116).

When receiving the message transmitted from the indoor unit 50, the control unit 31 of the outdoor unit 30 checks the application layer header of the received message. When the method is designated as "INF" in the application layer header, the necessary or unnecessary of response is "unnecessary". In this case, the control unit 31 causes the storage unit 32 to store the data included in the message received from the indoor unit 50 without returning a response (step S117). Here, the received message may be stored only in the volatile memory provided in the storage unit 32, or may be stored in the volatile memory and then copied and stored in the nonvolatile memory.

In the flowcharts shown in FIGS. 7 and 8, the determinations are performed in the order of whether to acquire data, whether to update data of the partner, and whether to notify the partner of the data, but the order of these determinations is merely for convenience, and the determinations can be performed in any order.

Figure 9:
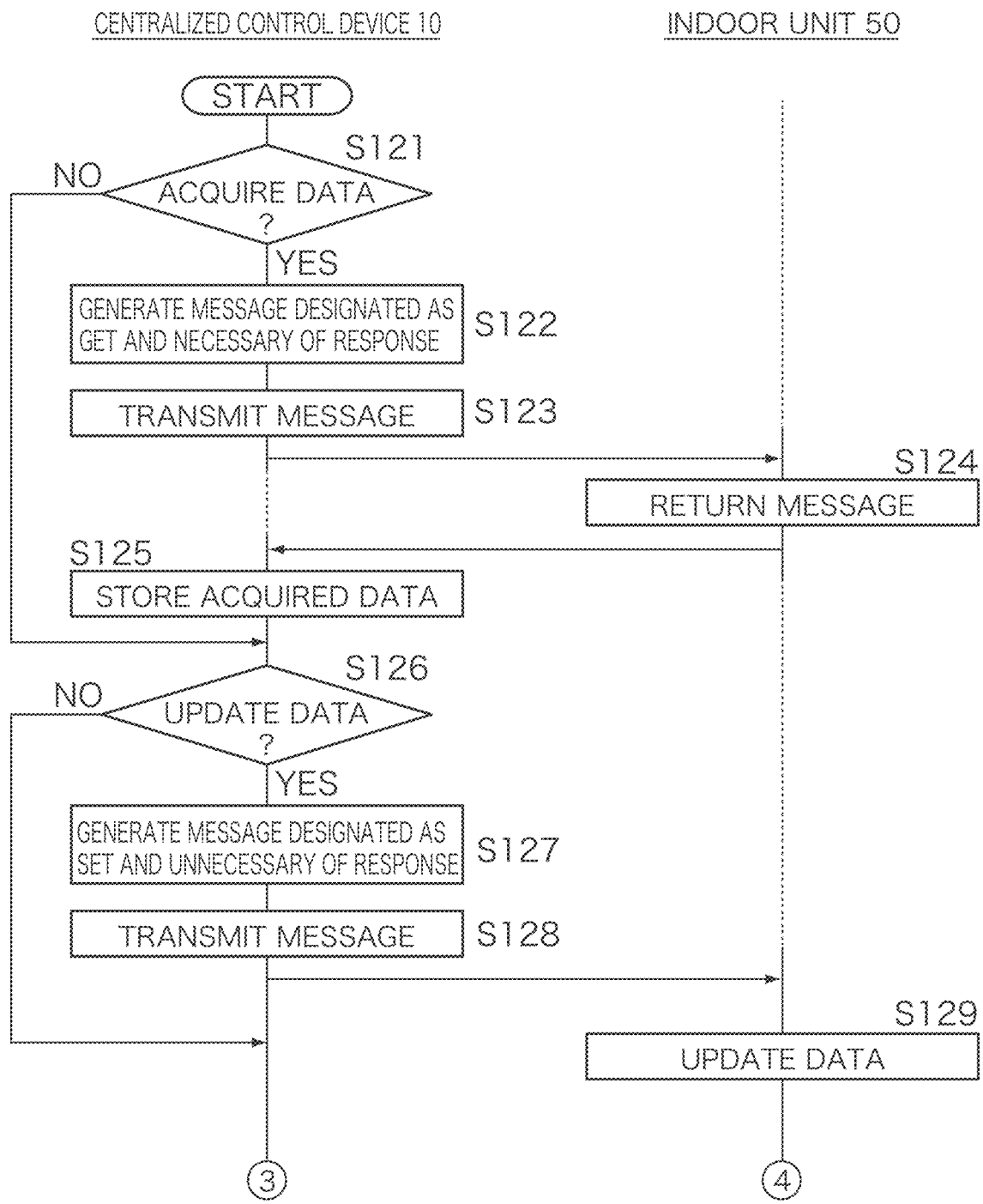
FIG. 9 is a flowchart illustrating a communication protocol in communication related to centralized control.
Figure 10:
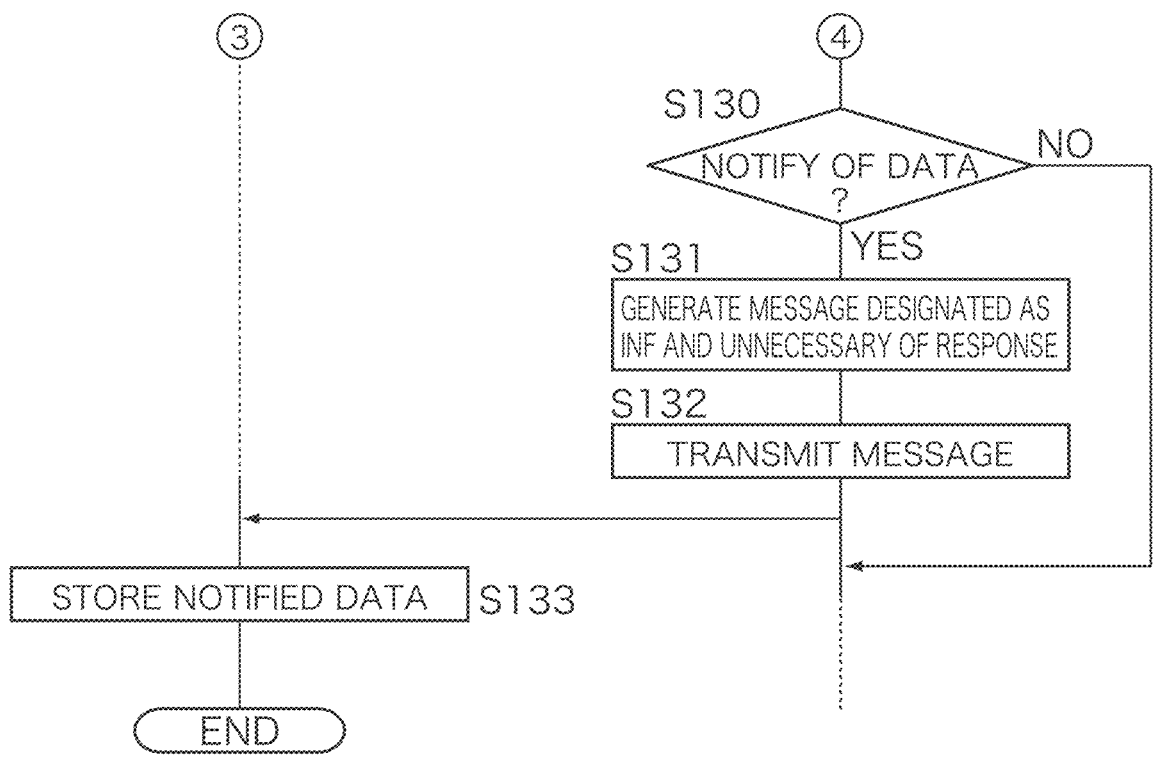
FIG. 10 is a flowchart illustrating the communication protocol in communication related to centralized control.

FIGS. 9 and 10 are flowcharts illustrating a communication protocol in the communication related to the centralized control. In communication related to centralized control, the centralized control device 10 performs communication for centralized monitoring and operation of each of the outdoor units 30 and each of the indoor units 50. The centralized control device 10 displays status of each of the outdoor units 30 and each of the indoor units 50 on the display unit 14 using icons, and performs air conditioning control and scheduled operation through an icon operation via the operation unit 15. In the flowcharts shown in FIGS. 9 and 10, for simplification, a communication protocol between the centralized control device 10 and the indoor unit 50 will be described.

The control unit 11 of the centralized control device 10 determines whether to acquire data of the indoor unit 50 (step S121). The control unit 11 may refer to the output of the built-in clock or the built-in timer to determine whether the current time point corresponds to a timing set as an acquisition timing, and determine whether to acquire the data of the indoor unit 50. As the acquisition timing for data, for example, a periodic timing is designated.

When determining to acquire the data of the indoor unit 50 (S121: YES), the control unit 11 generates a message including an application layer header in which the method is designated as "GET" and the necessary or unnecessary of response is designated as "necessary" (step S122). The control unit 11 transmits the generated message from the communication unit 13 to the indoor unit 50 as a destination (step S123).

When receiving the message transmitted from the centralized control device 10, the control unit 51 of the indoor unit 50 checks the application layer header of the received message. When the method is designated as "GET" in the application layer header, the necessary or unnecessary of response is "necessary", and thus the control unit 51 generates a message including the data requested by the centralized control device 10 and returns the message to the centralized control device 10 (step S124).

When receiving the reply message from the indoor unit 50, the control unit 11 of the centralized control device 10 causes the storage unit 12 to store the data included in the received message (step S125). Here, the received message may be stored only in the volatile memory provided in the storage unit 12, or may be stored in the volatile memory and then copied and stored in the nonvolatile memory.

Next, the control unit 11 of the centralized control device 10 determines whether to update the data of the indoor unit 50 (step S126). For example, when a change in state occurs due to an icon operation via the operation unit 15 or a schedule, the control unit 11 determines to update the data of the indoor unit 50.

When determining to update the data of the indoor unit 50 (S126: YES), the control unit 11 generates a message including an application layer header in which the method is designated as "SET" and the necessary or unnecessary of response is designated as "unnecessary" (step S127). The control unit 11 transmits the generated message from the communication unit 13 to the indoor unit 50 as a destination (step S128).

When receiving the message transmitted from the centralized control device 10, the control unit 51 of the indoor unit 50 checks the application layer header of the received message. When the method is designated as "SET" in the application layer header, the necessary or unnecessary of response is "unnecessary". The control unit 51 updates the data stored in the storage unit 52 in response to the "SET" request (step S129). The data to be updated may be stored in the volatile memory provided in the storage unit 52 or the nonvolatile memory.

The indoor unit 50 basically only receives communication from the centralized control device 10, but may notify the centralized control device 10 of data when the internal state changes due to an operation of a remote controller, for example.

The control unit 51 of the indoor unit 50 determines whether to notify the centralized control device 10 of its own data (step S130). When there is a change in the internal state of the own device and it is determined to notify the data (S130: YES), the control unit 51 generates a message including an application layer header in which the method is designated as "INF" and the necessary or unnecessary of response is designated as "unnecessary" (step S131). The control unit 51 transmits the generated message from the communication unit 53 to the centralized control device 10 (step S132).

When receiving the message transmitted from the indoor unit 50, the control unit 11 of the centralized control device 10 checks the application layer header of the received message. When the method is designated as "INF" in the application layer header, the necessary or unnecessary of response is "unnecessary". In this case, the control unit 11 causes the storage unit 32 to store the data included in the message received from the indoor unit 50 without returning a response (step S133). Here, the received message may be stored only in the volatile memory provided in the storage unit 32, or may be stored in the volatile memory and then copied and stored in the nonvolatile memory.

In the flowcharts shown in FIGS. 9 and 10, the determinations are performed in the order of whether to acquire data, whether to update data of the partner, and whether to notify the partner of the data, but the order of these determinations is merely for convenience, and the determinations can be performed in any order.

Generally, a relationship between a request and a response is defined in communication, but the present embodiment has a configuration in which, in a situation where a response is not necessary, the necessary or unnecessary of response is designated as "unnecessary", and no response is returned to a received request. With the above-described configuration, according to the present embodiment, it is possible to secure a communication band and to reduce a load on each of the devices.

Second Embodiment

In the first embodiment, when the message is transmitted from the first communication node to the second communication node, the first communication node designates the necessary or unnecessary of response. Alternatively, the necessary or unnecessary of response may be determined based on a code (method) in the message received by the second communication node without designating the necessary or unnecessary of response in the first communication node.

In the second embodiment, a configuration in which the second communication node determines the necessary or unnecessary of response based on a code (method) in the received message will be described.

All components of a refrigeration and air conditioning-related system 1 in the second embodiment and internal components of each device in the refrigeration and air conditioning-related system 1 are similar to those in the first embodiment, and thus will not be described. The configuration of a message generated in each device (communication node) is similar to that in the first embodiment, but, in the second embodiment, it is not necessary to designate the necessary or unnecessary of response using an HTTP query.

Hereinafter, an operation when the indoor unit 50 receives a message from the outside will be described.

Figure 11:
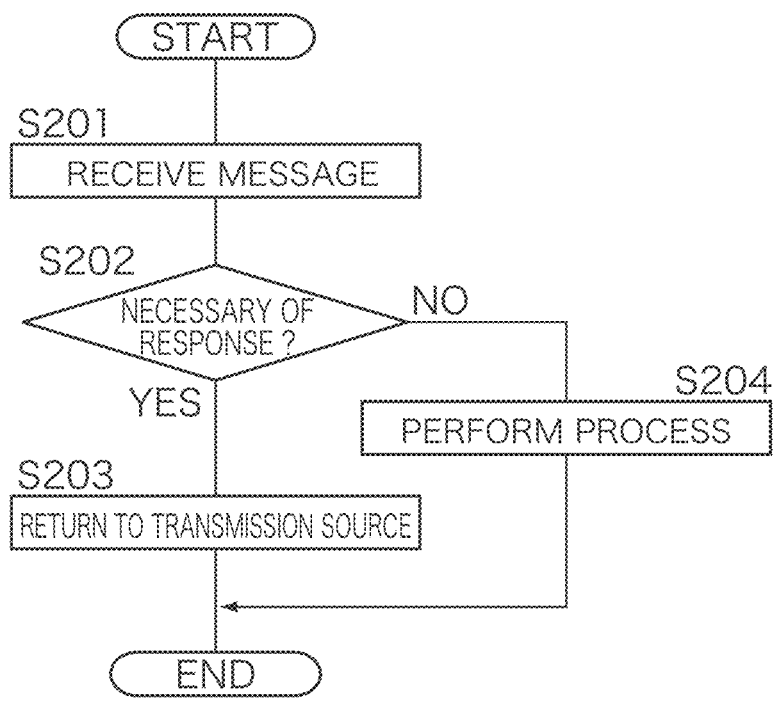
FIG. 11 is a flowchart illustrating a procedure of processing executed when the indoor unit receives a message.

FIG. 11 is a flowchart illustrating a procedure of a processing executed when the indoor unit 50 receives a message. In the communication related to the refrigerant control, the indoor unit 50 receives a message transmitted from the outdoor unit 30, for example. In the communication related to the centralized control, the indoor unit 50 receives, for example, a message transmitted from the centralized control device 10.

When receiving the message transmitted from the outdoor unit 30 or the centralized control device 10 (step S201), the control unit 51 of the indoor unit 50 checks an application layer header of the received message and determines a necessary or unnecessary of response (step S202). When a method designated in the application layer header of the received message is "GET", the transmission source of the message requests the indoor unit 50 to transmit data, and thus the control unit 51 determines that the necessary or unnecessary of response is "necessary". On the other hand, when the method designated in the application layer header of the received message is "SET", the transmission source of the message is only requesting the indoor unit 50 to update data, and thus the control unit 51 determines that the necessary or unnecessary of response is "unnecessary". In addition, when the method designated in the application layer header of the received message is "INF", the transmission source of the message only notifies the indoor unit 50 of information, and thus the control unit 51 determines that the necessary or unnecessary of response is "unnecessary".

When determining in step S202 that the necessary or unnecessary of response is "necessary" (S202: YES), that is, when the method designated in the application layer header of the received message is "GET", the control unit 51 generates a message including data requested by the outdoor unit 30 or the centralized control device 10 that is the transmission source of the message (for example, data such as sensor values and the control state of the indoor unit 50), and returns the message to the transmission source (step S203).

When determining in step S202 that the necessary or unnecessary of response is "unnecessary" (S202: NO), the control unit 51 does not respond to the received message and performs a process according to the method designated in the message (step S204). That is, the control unit 51 performs a process of updating the data stored in the storage unit 52 when the method designated in the application layer header of the received message is "SET", and performs a process of causing the storage unit 52 to store the notified data when the method is "INF".

In the flowchart of FIG. 11, the operation in a case where the indoor unit 50 receives a message from the outside has been described, but even in a case where the centralized control device 10 or the outdoor unit 30 receives a message, the necessary or unnecessary of response may be determined based on a code (method) in the received message.

As described above, in the second embodiment, the receiving side can determine the necessary or unnecessary of response based on the code (method) in the message without designating the necessary or unnecessary of response in the message.

Third Embodiment

In the first and second embodiments, the necessary or unnecessary of response is determined based on the code (method) or the type in the message, but the necessary or unnecessary of response may be determined based on another attribute.

In the third embodiment, a configuration will be described in which the necessary or unnecessary of response is determined according to the type of an application that has generated a message.

All components of a refrigeration and air conditioning-related system 1 in the third embodiment and internal components of each device in the refrigeration and air conditioning-related system 1 are similar to those in the first embodiment, and thus will not be described. A format of a message transmitted and received by each device (communication node) is similar to that shown in the first embodiment, but in the third embodiment, information including an application programming interface (API) version/application name/resource name is stored in a uniform resource identifiers (URI) area. For example, when a message transmitted and received in the refrigerant control is generated by an application called "product control", "prd" representing the "product control" is designated as the application name of the message. Further, when a message transmitted and received in the centralized control is generated by an application called "monitor", "mon" representing the "monitor" is designated as the application name of the message. Appropriate values are stored for the API version and the resource name. In the third embodiment, the necessary or unnecessary of response is determined from the viewpoint of whether the response is necessary as an application.

Figure 12:
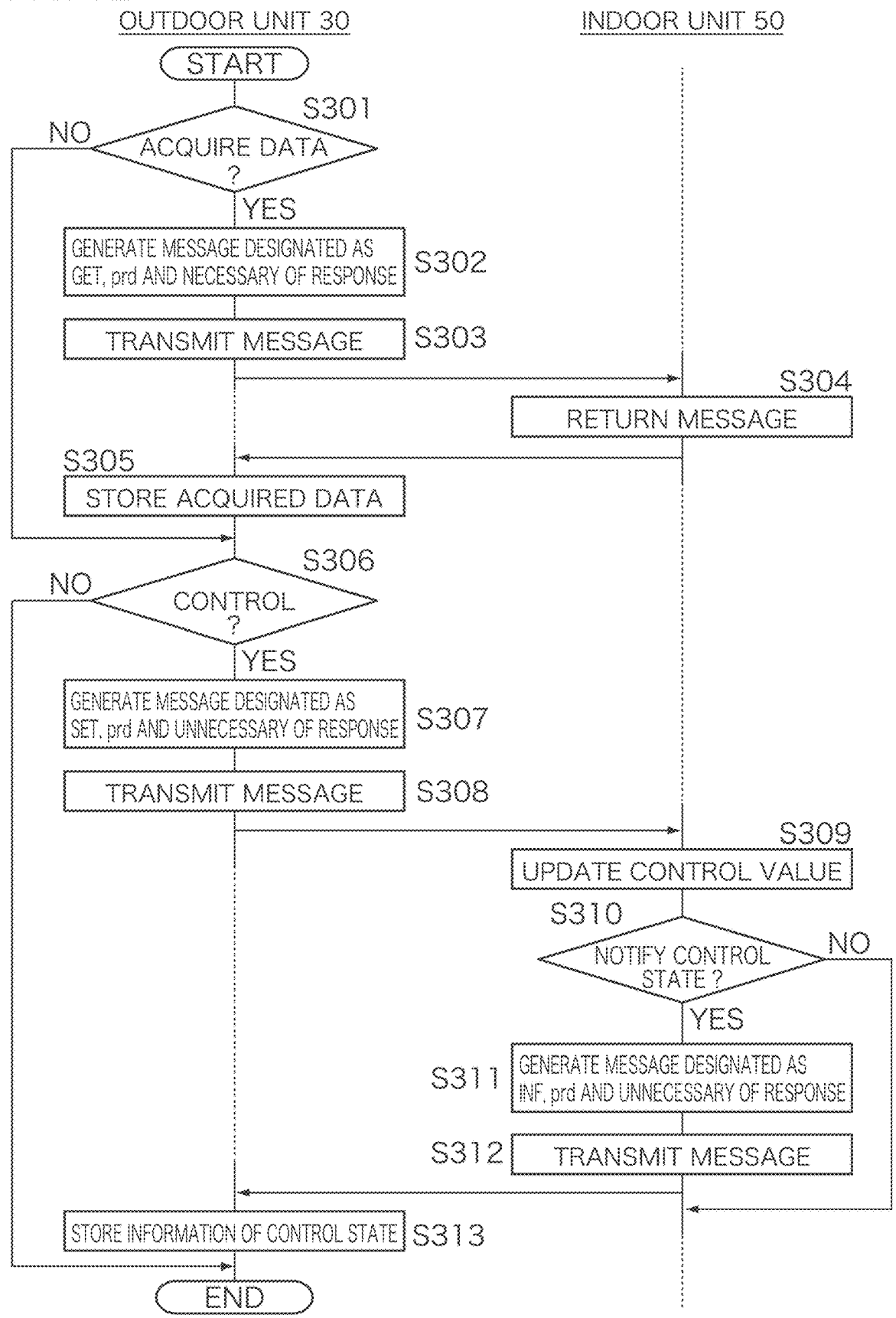
FIG. 12 is a flowchart illustrating a communication protocol in refrigerant control according to a third embodiment.

FIG. 12 is a flowchart illustrating a communication protocol in the refrigerant control according to the third embodiment. In the refrigerant control, the above-described application called "product control" is executed in the outdoor unit 30 and the indoor unit 50, and communication related to the refrigerant control is performed by transmitting and receiving messages generated through the application.

The outdoor unit 30 periodically requests data of the indoor unit 50 in order to perform overall control. The control unit 31 of the outdoor unit 30 determines whether to acquire data of the indoor unit 50 (step S301), and generates a message including an application layer header in which the method is designated as "GET", the application name is designated as "prd", and the necessary or unnecessary of response is designated as "necessary" (step S302) when determining to acquire the data (S301: YES). When the outdoor unit 30 requests data from the indoor unit 50, a response by the indoor unit 50 is necessary. That is, since the response is necessary as the "product control" application, the necessary or unnecessary of response is designated as "necessary". The control unit 31 transmits the generated message from the communication unit 33 to the indoor unit 50 as a destination (step S303).

When receiving, from the outdoor unit 30, the message in which the method is designated as "GET", the application name is designated as "prd", and the necessary or unnecessary of response is designated as "necessary", the control unit 51 of the indoor unit 50 generates a message including the data requested by the outdoor unit 30 and returns the message to the outdoor unit 30 (step S304).

When receiving the message returned from the indoor unit 50, the control unit 31 of the outdoor unit 30 causes the storage unit 32 to store the data included in the received message (step S305).

In the refrigerant control, the outdoor unit 30 may control an actuator of the indoor unit 50. The control unit 31 of the outdoor unit 30 determines whether to control the actuator of the indoor units 50 (step S306), and when determining to control (S306: YES), generates a message including an application layer header in which the method is designated as "SET", the application name is designated as "prd", and the necessary or unnecessary of response is designated as "unnecessary" and including a control value in data (step S307). The outdoor unit 30 transmits a control command to the indoor unit 50 when a command content changes, but may transmit the control command to the indoor unit 50 at a periodic timing even when missing the timing, and thus no response is not necessary from the indoor unit 50. That is, since the response is not necessary as the "product control" application, the necessary or unnecessary of response is designated as "unnecessary". The control unit 31 transmits the generated message from the communication unit 33 to the indoor unit 50 as a destination (step S308).

When receiving, from the outdoor unit 30, the message in which the method is designated as "SET", the application name is designated as "prd", the necessary or unnecessary of response is designated as "unnecessary", and the control value is included, the control unit 51 of the indoor unit 50 updates the control value for the actuator to control the actuator (step S309).

In the refrigerant control, when the control state changes due to a remote control operation or the like, the indoor unit 50 notifies the outdoor unit 30 of the change in the control state. The control unit 51 of the indoor unit 50 determines whether to notify the outdoor unit 30 of the control state (step S310), and when determining to notify the control state (S310: YES), generates a message including an application layer header in which the method is designated as "INF", the application name is designated as "prd", and the necessary or unnecessary of response is designated as "unnecessary", and including information of the control state in data (step S311). Since the indoor unit 50 only notifies the outdoor unit 30 of the information periodically acquired using the GET method when the content changes, no response is necessary from the outdoor unit 30. That is, since the response is not necessary as the "product control" application, the necessary or unnecessary of response is designated as "unnecessary". The control unit 51 transmits the generated message from the communication unit 53 to the outdoor unit 30 (step S312).

When receiving, from the indoor unit 50, the message in which the method is designated as "INF", the application name is designated as "prd", the necessary or unnecessary of response is designated as "unnecessary", and which includes the information of the control state, the control unit 31 of the outdoor unit 30 performs a process of causing the storage unit 32 to store the information of the control state included in the message (step S313).

Figure 13:
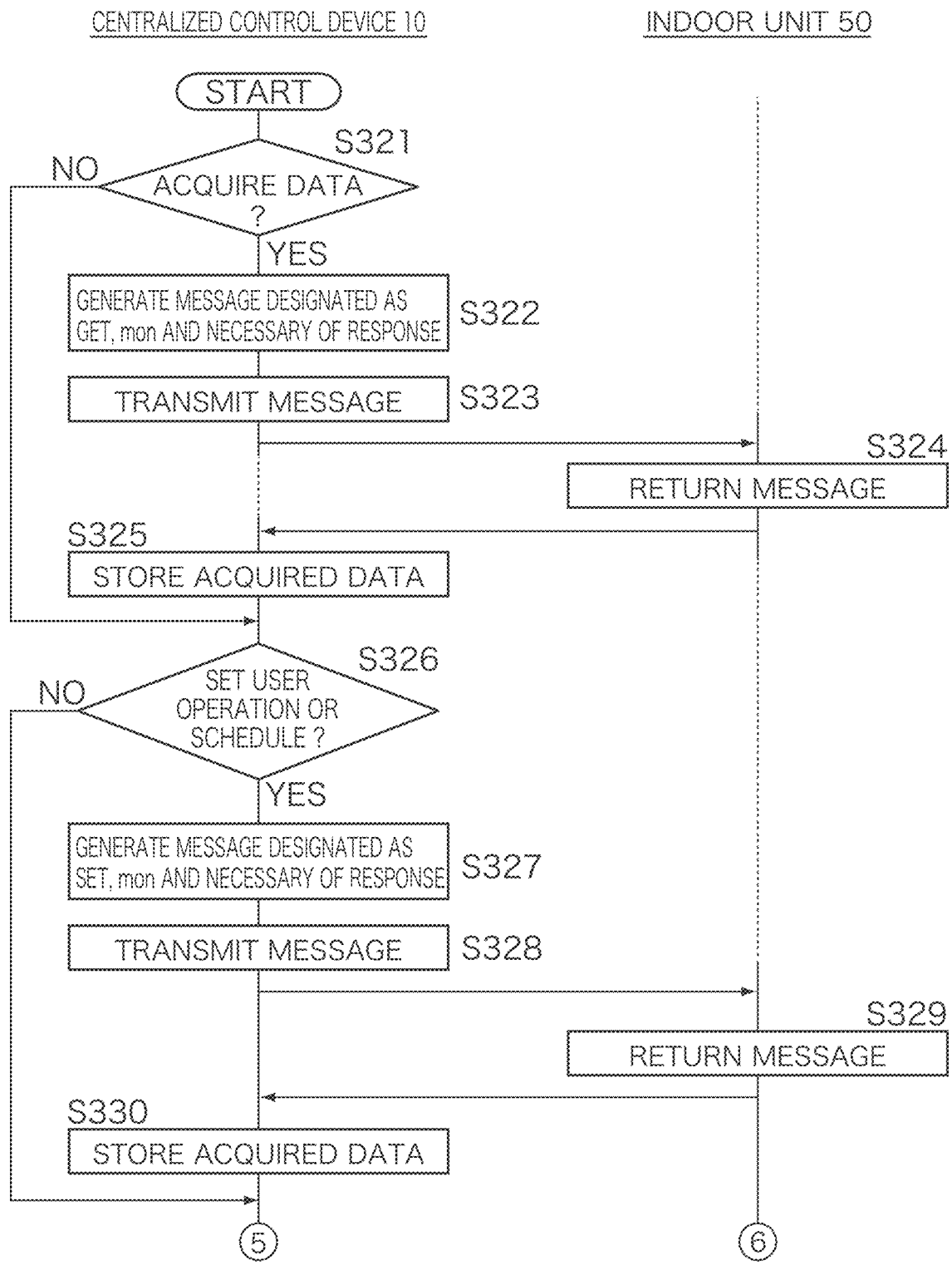
FIG. 13 is a flowchart illustrating a communication protocol in centralized control according to the third embodiment.
Figure 14:
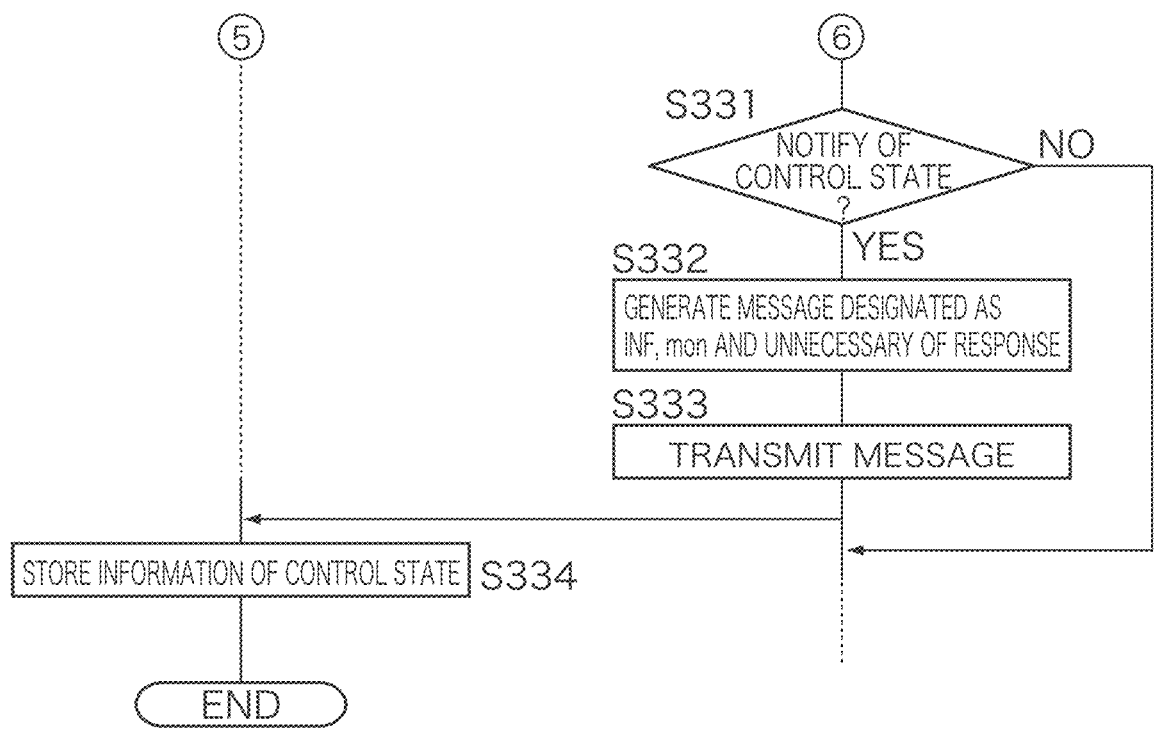
FIG. 14 is a flowchart illustrating the communication protocol in centralized control according to the third embodiment.

FIGS. 13 and 14 are flowcharts illustrating a communication protocol in centralized control according to the third embodiment. In the centralized control, the above-described application called "monitor" is executed in the centralized control device 10, the outdoor unit 30, and the indoor unit 50, and communication related to the centralized control is performed by transmitting and receiving messages generated through the application. Hereinafter, communication between the centralized control device 10 and the indoor unit 50 will be described.

The centralized control device 10 periodically requests data of the indoor unit 50 in order to perform overall control. The control unit 11 of the centralized control device 10 determines whether to acquire data of the indoor unit 50 (step S321), and generates a message including an application layer header in which the method is designated as "GET", the application name is designated as "mon", and the necessary or unnecessary of response is designated as "necessary" (step S322) when determining to acquire the data (S321: YES). When the centralized control device 10 requests data from the indoor unit 50, a response by the indoor unit 50 is necessary. That is, since the response is necessary as the "monitor" application, the necessary or unnecessary of response is designated as "necessary". The control unit 11 transmits the generated message from the communication unit 13 to the indoor unit 50 as a destination (step S323).

When receiving, from the centralized control device 10, the message in which the method is designated as "GET", the application name is designated as "mon", and the necessary or unnecessary of response is designated as "necessary", the control unit 51 of the indoor unit 50 generates a message including the data requested by the centralized control device 10 and returns the message to the centralized control device 10 (step S324).

When receiving the message returned from the indoor unit 50, the control unit 11 of the centralized control device 10 causes the storage unit 12 to store the data included in the received message in (step S325).

In the centralized control, a user operation or schedule setting may be performed on the indoor unit 50 from the centralized control device 10. The control unit 11 of the centralized control device 10 determines whether to perform a user operation or schedule setting on the indoor units 50 (step S326), and when determining to perform the user operation or schedule setting (S326: YES), generates a message including an application layer header in which the method is designated as "SET", the application name is designated as "mon", and the necessary or unnecessary of response is designated as "necessary" and including in the data an operation value related to the user operation or a setting value related to the schedule setting (step S327). When there is no response from the indoor unit 50 to the user operation or an instruction of the schedule setting, the centralized control device 10 needs to confirm whether there is a communication abnormality, and thus the response from the indoor unit 50 is necessary. That is, since the response is necessary as the "monitor" application, the necessary or unnecessary of response is designated as "necessary". The control unit 11 transmits the generated message from the communication unit 13 to the indoor unit 50 (step S328).

When receiving, from the centralized control device 10, the message in which the method is designated as "SET", the application name is designated as "mon", the necessary or unnecessary of response is designated as "necessary" and which includes the operation value or the setting value, the control unit 51 of the indoor unit 50 performs a user operation or schedule setting based on the received message, and returns a message including information that the user operation or schedule setting has been completed (step S329).

When receiving the message returned from the indoor unit 50, the control unit 11 of the centralized control device 10 causes the storage unit 32 to store data included in the received message (step S330).

In the centralized control, when the control state changes due to the user operation or the like, the indoor unit 50 notifies the centralized control device 10 of the change in the control state. The control unit 51 of the indoor unit 50 determines whether to notify the centralized control device 10 of the control state (step S331), and when determining to notify (S331: YES), generates a message including an application layer header in which the method is designated as "INF", the application name is designated as "mon", and the necessary or unnecessary of response is designated as "unnecessary", and including information of the control state in data (step S332). Since the indoor unit 50 only notifies the centralized control device 10 of the information periodically acquired using the GET method when the content changes, no response is necessary from the centralized control device 10. That is, since the response is not necessary as the "monitor" application, the necessary or unnecessary of response is designated as "unnecessary". The control unit 51 transmits the generated message from the communication unit 53 to the centralized control device 10 (step S333).

When receiving, from the indoor unit 50, the message in which the method is designated as "INF", the application name is designated as "mon", the necessary or unnecessary of response is designated as "unnecessary", and which includes the information of the control state, the control unit 11 of the centralized control device 10 performs a process of causing the storage unit 12 to store the information of the control state included in the message (step S334).

Although the communication between the centralized control device 10 and the indoor unit 50 has been described in the flowcharts of FIGS. 13 and 14, the same applies to the communication between the centralized control device 10 and the outdoor unit 30.

As described above, according to the third embodiment, the necessary or unnecessary of response is determined according to the type of an application that has generated a message. For example, even for the same "SET" request, the necessary or unnecessary of response is designated as "unnecessary" in the application (product control) for the refrigerant control, and the necessary or unnecessary of response is designated as "necessary" in the application (monitor) for the centralized control.

In the third embodiment, the necessary or unnecessary of response is designated on the message transmitting side, but as in the second embodiment, the necessary or unnecessary of response may not be designated in a message to be transmitted, and the device on the receiving side may determine the necessary or unnecessary of response with reference to the information (the method name and the application name) included in the message.

Fourth Embodiment

In the fourth embodiment, a configuration will be described in which a message is transmitted from the outdoor unit 30 to the indoor unit 50 to designate a transmission timing of data when the indoor unit 50 detects a change in state.

In the fourth embodiment, when data relating to the change in state of the refrigeration and air conditioning-related unit is transmitted from the indoor unit 50 to the outdoor unit 30, time slicing is performed so that the load is not concentrated on the outdoor unit 30. Here, the change in state of the refrigeration and air conditioning-related unit represents, for example, changes in values of various sensors and actuators provided in the indoor unit 50.

Specifically, when the indoor unit 50 (second communication node) detects a change in state, the outdoor unit 30 (first communication node) generates a message including information related to the transmission timing at which the indoor unit 50 should transmit data, and transmits the generated message to the indoor unit 50. The information related to the transmission timing is described in, for example, a payload of data following the application layer header. The indoor unit 50 avoids load concentration on the outdoor unit 30 by transmitting the data according to the timing described in the message.

Figure 15:
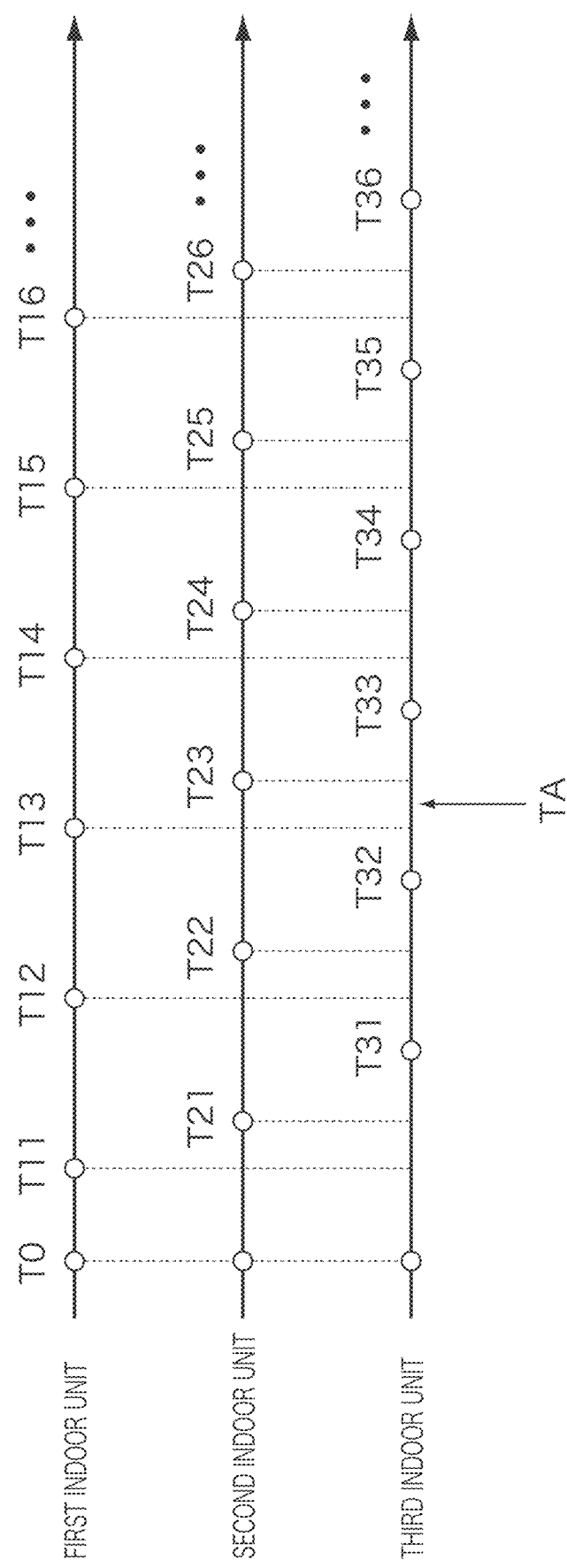
FIG. 15 is an explanatory diagram illustrating a setting example of a transmission timing.

FIG. 15 is an explanatory diagram illustrating a setting example of the transmission timing. The transmission timing is defined based on an elapsed time from a reference time synchronized in the plurality of indoor units 50, and is determined as a timing unique to each of the plurality of indoor units 50. In the example of FIG. 15, transmission timings in three indoor units 50, 50, and 50 are shown.

Time T0 indicates a reference time synchronized in the three indoor units 50, 50, and 50. Times T11, T12, T13, and so on indicate transmission timings determined for the first indoor unit 50, times T21, T22, T23, and so on indicate transmission timings determined for the second indoor unit 50, and times T31, T32, T33, and so on indicate transmission timings determined for the third indoor unit 50.

In the example of FIG. 15, the indoor units 50 have the same cycle of the transmission timing. That is, T12-T11 (=T13-T12=T14-T13= . . . )=T22-T21 (=T23-T22=T24-T23= . . . )=T32-T31 (=T33-T32=T34-T33= . . . ). In the example of FIG. 15, a time interval between the reference time and the first transmission timing is set to a value unique to each indoor unit 50. That is, T11≠T21≠T31. As described above, it is possible to shift the transmission timing of each of the indoor units 50 by the setting of the transmission timing of each indoor unit 50.

Each of the indoor units 50 calculates a timing at which the information related to the change in state can be transmitted, based on the transmission timing determined for the own device. For example, it is assumed that the change in state is detected in each of the indoor units 50 at a time TA shown in FIG. 15 as an operation command is transmitted from the centralized control device 10 to each of the indoor units 50 simultaneously. In this case, in the first indoor unit 50, since the earliest timing after the detection of the change in state is T14 of the plurality of transmission timings T11, T12, . . . , the data transmission is delayed until that time. That is, the delay time of the first indoor unit 50 is T14-TA. Further, in the second indoor unit 50, since the earliest timing after the detection of the change in state is T23 of the plurality of transmission timings T21, T22, . . . , the data transmission is delayed until that time. That is, the delay time of the second indoor unit 50 is T23-TA. Similarly, in the third indoor unit 50, since the earliest timing after the detection of the change in state is T33 of the plurality of transmission timings T31, T32, . . . , the data transmission is delayed until that time. That is, the delay time of the third indoor unit 50 is T33-TA.

In the example of FIG. 15, the cycle of the transmission timing set in each of the indoor units 50 is constant, but different cycles may be set between the indoor units 50 as long as the transmission timing does not overlap in two or more indoor units 50. The transmission timing of the indoor unit 50 can be appropriately set according to the number of indoor units 50 which should transmit data, the priority of the indoor units 50 which should transmit data, and the like.

Further, the transmission timing of the indoor unit 50 may be set based on the time that has elapsed since each of the indoor units 50 detects the change in state. For example, when each of the indoor units 50 detects the change in state at the time TA, the first indoor unit 50 may set the timing at which the time T1 has elapsed from the TA as a transmission timing, the second indoor unit 50 may set the timing at which T2 (≠T1) has elapsed from the time TA as a transmission timing, and the third indoor unit 50 may set the timing at which T3 (≠T1≠T2) has elapsed from the time TA as a transmission timing.

Figure 16:
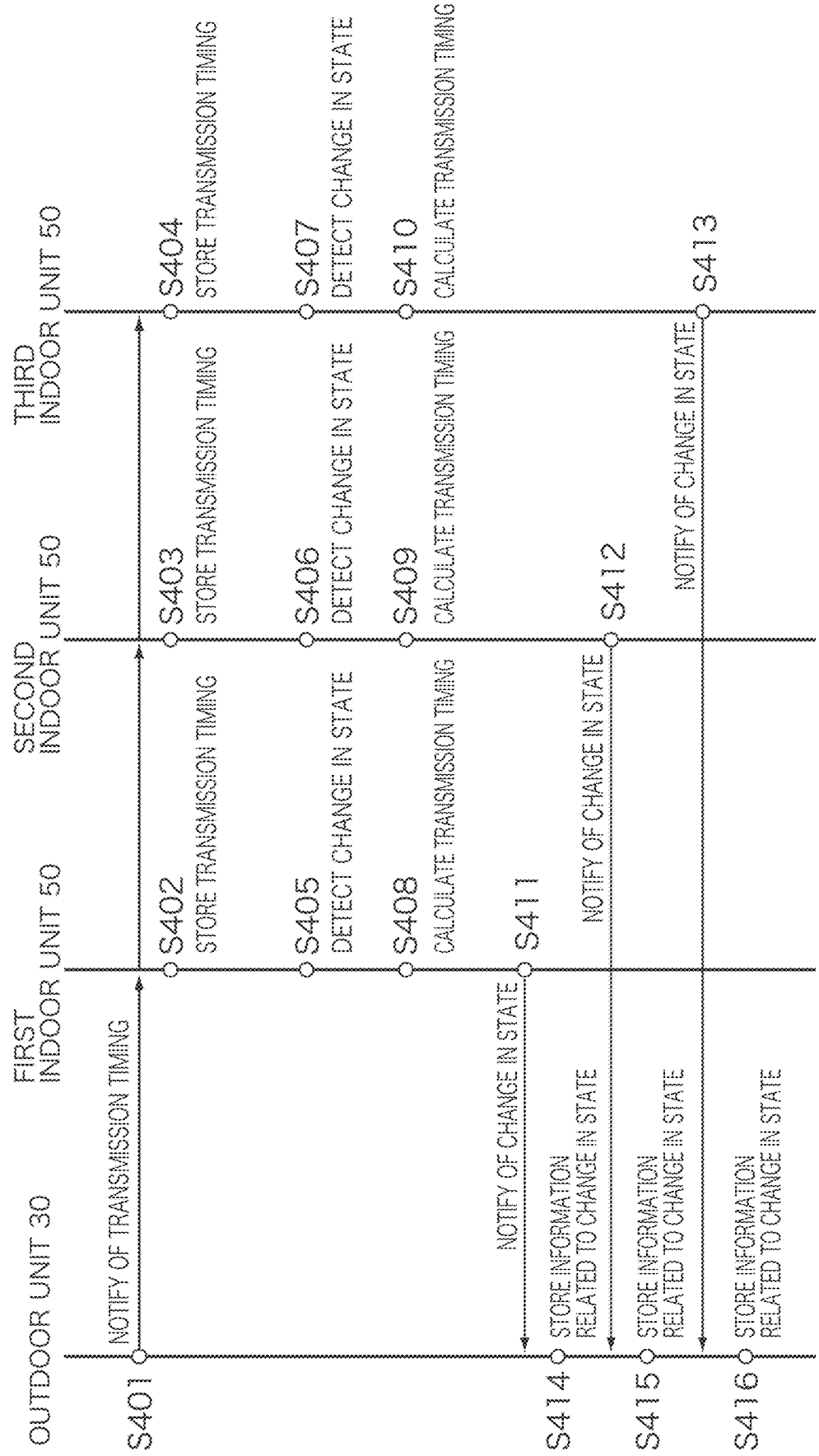
FIG. 16 is a timing chart illustrating a communication protocol in a fourth embodiment.

FIG. 16 is a timing chart illustrating a communication protocol according to the fourth embodiment. The control unit 31 of the outdoor unit 30 generates a message including information related to the transmission timing at which each of the indoor units 50 should transmit data, and notifies each of the outdoor units 30 of the transmission timing by transmitting the generated message from the communication unit 33 to each of the indoor units 50 (step S401). In step S401, since the notification is from the outdoor unit 30 to the indoor unit 50, the control unit 31 generates a message including an application layer header in which the method is designated as "INF" and the necessary or unnecessary of response is designated as "unnecessary" and including a payload of data in which the transmission timing unique to each of the indoor units 50 is described, and transmits the message to each of the indoor units 50.

When receiving the message transmitted from the outdoor unit 30, the control unit 51 of each of the indoor units 50 checks the application layer header of the received message. When the method is designated as "INF" in the application layer header, since the necessary or unnecessary of response is "unnecessary", the control unit 51 does not reply to the received message and causes the storage unit 52 to store data including the transmission timing (steps S402 to S404). Here, the received message may be stored only in the volatile memory provided in the storage unit 52, or may be stored in the volatile memory and then copied and stored in the nonvolatile memory.

The control unit 51 of each of the indoor units 50 monitors states of the sensors and actuators provided therein. When detecting a change in state of the own device (steps S405 to S407), the control unit 51 calculates a timing at which the own device can transmit data, based on the transmission timing stored in the storage unit 52 (steps S408 to S410). Here, the transmission timing of the own device may be stored in the volatile memory provided in the storage unit 52, or may be stored in the nonvolatile memory.

Each of the indoor units 50 determines whether the current time point is a transmittable timing, generates a message including information related to the change in state when determining to be at the transmittable timing, and transmits the generated message from the communication unit 53 to the outdoor unit 30, thereby notifying the outdoor unit 30 of the change in state (steps S411 to S413). In steps S411 to S413, since the notification is in association with the change in state from the indoor unit 50 to the outdoor unit 30, the control unit 31 generates a message including an application layer header in which the method is designated as "INF" and the necessary or unnecessary of response is designated as "unnecessary", and including the information related to the change in state in the data, and transmits the message to the outdoor unit 30.

Every time receiving the message transmitted from each of the indoor units 50, the outdoor unit 30 returns an ACK telegram and causes the storage unit 32 to store the information related to the change in state of each of the indoor units 50 (steps S414 to S416). Here, the received message may be stored only in the volatile memory provided in the storage unit 32, or may be stored in the volatile memory and then copied and stored in the nonvolatile memory.

As described above, according to the fourth embodiment, for example, when an operation command is transmitted from the centralized control device 10 to each of the indoor units 50 at the same time, even in a situation in which each of the indoor units 50 detects the change in state at the same timing and the notification regarding the change in state is simultaneously executed from each of the indoor units 50, each of the indoor units 50 delays the notification regarding the change in state according to the transmission timing uniquely determined for each of the devices, thereby avoiding load concentration on the outdoor unit 30 on the receiving side.

The present embodiment has a configuration in which the outdoor unit 30 notifies each of the indoor units 50 of the transmission timing, but the centralized control device 10 may notify each of the indoor units 50 of the transmission timing, or a service checker may be connected to the refrigeration and air conditioning-related unit and the service checker may notify each of the indoor units 50 of the transmission timing.

It should be understood that the embodiments disclosed herein are illustrative in all respects and not restrictive. The scope of the present invention is defined by the appended claims, not by the above-described meaning, and is intended to include all modifications within the scope and meaning equivalent to the appended claims.

It is to be noted that, as used herein and in the appended claims, the singular forms "a", "an", and "the" include plural referents unless the context clearly dictates otherwise.

What is claimed is:

1. A communication method for communicating information regarding a refrigeration and air conditioning-related unit between a plurality of communication nodes, wherein
    when transmitting information to a second communication node,
    a first communication node generates a message including a code indicating an attribute of the information or a type indicating a necessary or unnecessary of response to be designated according to the attribute, and transmits the message generated to the second communication node, and
    the second communication node determines the necessary or unnecessary of response, based on the code or the type included in the message received, wherein
    the attribute of the message includes at least a second attribute, and
    the second attribute is the type of application that generates the message.

2. The communication method according to claim 1, wherein the plurality of communication nodes include an outdoor unit and an indoor unit, and
    the outdoor unit generates, when transmitting the information to the indoor unit, a message including an unnecessary of response as a type and transmits the message generated to the indoor unit.

3. The communication method according to claim 1, wherein the plurality of communication nodes include an outdoor unit and an indoor unit, and
    the indoor unit generates, when transmitting the information to the outdoor unit, a message including an unnecessary of response as a type and transmits the message generated to the outdoor unit.

4. The communication method according to claim 2, wherein the plurality of communication nodes further include a centralized control device, and
    the centralized control device generates, when transmitting information regarding a centralized control to the outdoor unit, a message including a necessary of response as a type and transmits the message generated to the outdoor unit.

5. The communication method according to claim 2, wherein the plurality of communication nodes further include a centralized control device, and
    the centralized control device generates, when transmitting information regarding a centralized control to the indoor unit, a message including a necessary of response as a type and transmits the message generated to the indoor unit.

6. The communication method according to claim 2, wherein the plurality of communication nodes further include a centralized control device, and
    the indoor unit generates, when transmitting information regarding a centralized control to the centralized control device, a message including a unnecessary of response as a type and transmits the message generated to the centralized control device.

7. The communication method according to claim 1, wherein the message has a format defined by a representational state transfer application programing interface (REST API).

8. The communication method according to claim 1, wherein an attribute of the message further includes a first attribute, and
the first attribute includes an acquisition request, an update request, and a notification of data.

9. The communication method according to claim 8, wherein
the second communication node determines the necessary or unnecessary of response, based on at least one of the first attribute and the second attribute included in the message received.

10. A refrigeration and air conditioning-related system for communicating information regarding a refrigeration and air conditioning-related unit between a plurality of communication nodes, wherein
a first communication node includes
a control unit, and
a communication unit,
the control unit generates, when transmitting information to a second communication node, a message including a code indicating an attribute of the information or a type indicating a necessary or unnecessary of response to be designated according to the attribute,
the communication unit transmits the message generated by the control unit to the second communication node, and
the second communication node determines the necessary or unnecessary of response, based on the code or the type included in the message received, wherein
the attribute of the message includes at least a second attribute, and
the second attribute is the type of application that generates the message.

11. A communication node in a refrigeration and air conditioning-related system, comprising:
a control unit; and
a communication unit, wherein
the control unit generates, when transmitting information to an other communication node, a message including a code indicating an attribute of the information or a type indicating a necessary or unnecessary of response to be designated according to the attribute, and
the communication unit transmits the message generated by the control unit to the other communication node, wherein
the attribute of the message includes at least a second attribute, and
the second attribute is the type of application that generates the message.

12. A communication node in a refrigeration and air conditioning-related system, comprising:
a control unit; and
a communication unit, wherein
the communication unit receives, from another communication node, a message including a code indicating an attribute of information or a type indicating a necessary or unnecessary of response to be designated according to the attribute, and
the control unit determines the necessary or unnecessary of response, based on the code or the type included in the message received, wherein
the attribute of the message includes at least a second attribute, and
the second attribute is the type of application that generates the message.

* * * * *